United States Patent [19]

Goliaszewski et al.

[11] Patent Number: 5,612,421

[45] Date of Patent: Mar. 18, 1997

[54] METHODS AND COMPOSITIONS FOR PRETREATMENT OF METALS

[75] Inventors: Alan E. Goliaszewski, The Woodlands, Tex.; David W. Reichgott, Richboro, Pa.; Lothar S. Sander, Princeton, N.J.

[73] Assignee: BetzDearborn Inc., Trevose, Pa.

[21] Appl. No.: 611,152

[22] Filed: Mar. 5, 1996

Related U.S. Application Data

[62] Division of Ser. No. 392,696, Feb. 23, 1995, Pat. No. 5,518,770.

[51] Int. Cl.$^6$ ........................................ C08F 8/42
[52] U.S. Cl. ................ 525/326.5; 525/370; 525/371; 525/372; 525/373; 526/271
[58] Field of Search ..................... 525/326.5; 526/271

[56] References Cited

U.S. PATENT DOCUMENTS

| | | | |
|---|---|---|---|
| 3,423,376 | 1/1969 | Gobran et al. | 260/80.3 |
| 3,560,589 | 2/1971 | Sato et al. | 260/824 |
| 3,692,747 | 9/1972 | Domba | 260/78.5 T |
| 3,951,893 | 4/1976 | Gander | 526/271 |
| 4,191,596 | 3/1980 | Dollman et al. | 148/6.27 |
| 4,195,141 | 3/1980 | Büning et al. | 525/326.5 |
| 4,625,006 | 11/1986 | Bernhardt et al. | 525/326.5 |
| 4,853,438 | 8/1989 | Bernhardt et al. | 525/326.5 |
| 4,917,737 | 4/1990 | Carey et al. | 148/250 |
| 5,075,382 | 12/1991 | Ohmae et al. | 525/285 |
| 5,089,564 | 2/1992 | Bullen | 525/320 |

FOREIGN PATENT DOCUMENTS

| | | |
|---|---|---|
| 311722 | 4/1989 | European Pat. Off. |
| 1586650 | 3/1981 | United Kingdom . |
| WO85/05131 | 11/1985 | WIPO . |

OTHER PUBLICATIONS

SteamCure of Siloxane–Coated Glass Containers, Legally and Argyle, IEC Product Research and Development, v. 5, No. 3, 230 (1966).

Reactions of Vinyltrichlorosilane and Vinyltriethoxysilane, Wagner et al., Industrial and Engineering Chemistry, v. 45, No. 2, 367 (1953).

*Primary Examiner*—Bernard Lipman
*Attorney, Agent, or Firm*—Alexander D. Ricci; Philip H. Von Neida

[57] ABSTRACT

Methods and compositions for pretreating a metal surface are provided. The methods comprise applying to the metal surface a hydrolysate of a copolymer of an unsaturated carboxylic acid or derivative thereof and a vinyltrialkoxysilane compound. Novel zinc salt hydrolysate compositions and zirconium salt hydrolysate compositions are also disclosed.

4 Claims, No Drawings

METHODS AND COMPOSITIONS FOR PRETREATMENT OF METALS

This is a divisional of application Ser. No. 08/392,696 filed Feb. 23, 1995 now U.S. Pat. No. 5,518,770.

FIELD OF THE INVENTION

The present invention relates generally to methods and compositions useful for pretreating metal surfaces in preparation for painting. The non-chromium pretreatment coating improves the corrosion resistance of the metals and the adhesion of paints to their surfaces. The present invention is particularly directed to the non-chromium coating of aluminum, steel, galvanized steel, phosphated steel and zinc-aluminum coated steel.

BACKGROUND OF THE INVENTION

The purpose of conversion coatings on metal surfaces are to provide corrosion resistance and improve the adhesion of the ultimate coating. The conversion coating improves the adhesion of final coating layers such as paints, inks, lacquers and plastics.

Traditionally, chromates have been utilized as conversion coating compounds. Chromates are known to exhibit acceptable performance on different types of metals or alloys, such as aluminum, steel, galvanized steel and zinc-aluminum coated steel. Chromate conversion coatings are typically administered by contacting the metal surface with an aqueous solution containing hexavalent or trivalent chromium ions, phosphate ions or fluoride ions. Serious concerns have been raised, however, regarding the pollution effects of the chromate or phosphate discharged into rivers or waterways by such processes. Due to the high solubility and the strongly oxidizing character of hexavalent chromium ions, conventional chromate conversion coating processes require extensive waste treatment procedures to control their discharge.

While many acceptable chromium-free conversion coatings have been developed, their utility is often limited to only one type of metal substrate. Many industrial operations, however involve the sequential processing of different types of metals. Unless the undesirable chromium compounds are used, the industrial metal processor is forced to change the conversion coating bath for each different type of metal. This results in unacceptable downtime and higher processing costs.

SUMMARY OF THE INVENTION

The present invention provides for the use of copolymers of an unsaturated carboxylic acid or derivative thereof and vinyltrialkoxysilane compounds as pretreatment compositions for metal surfaces prior to their painting. The copolymers of the present invention improve the adhesion of paints to the metals and also improves their corrosion resistance.

DESCRIPTION OF THE RELATED ART

Copolymers of maleic anhydride and vinyl triethoxysilane are found to modify the surface characteristics of annealed glass containers as described in Steam Cure of Siloxane-Coated Glass Containers, Legally and Argyle, I&EC Product Research and Development, v. 5, No. 3, 230 (1966).

Copolymerization of vinyltriethoxysilane and maleic anhydride are discussed in Reactions of Vinyltrichlorosilane and Vinyltriethoxysilane, Industrial and Engineering Chemistry, Wagner et al., v. 45 No. 2, 367 (1953).

U.S. Pat. No. 3,560,589 discloses compositions of a copolymer prepared by reacting vinylalkoxysilane containing at least one alkoxy group with an ethylenically unsaturated carboxylic acid anhydride and an epoxy resin or a monomer containing an epoxy group. The resulting compositions provide water resistance, mechanical strength and electrical properties.

U.S. Pat. No. 3,692,747 teaches preparation of chromium chloride complexes of maleic anhydride copolymers and their use as water repellents for animal skins. U.S. Pat. No. 4,195,141 teaches preparative methods for semi-esters of vinyl alkoxysilane/maleic acid copolymers and their use as adhesivizers and as sewer sludge conditioners.

PCT application WO 85/05131 teaches an acidic aqueous coating solution of fluoride, metal salt, a sequestrant and a polymer which increase corrosion resistance when applied to galvanized metals.

DETAILED DESCRIPTION OF THE INVENTION

The present invention relates to methods for pretreating a metal surface in preparation for painting comprising applying to the metal surface a hydrolysate of a copolymer of an unsaturated carboxylic acid/derivative thereof and a vinyltrialkoxysilane compound.

The present invention also comprises non-chromium, metal pretreatment compositions comprising zinc and zirconium hydrolysates of a maleic anhydride: vinyltrialkoxysilane copolymer and zinc and zirconium hydrolysates of an acrylic acid:vinyltrialkoxysilane copolymer.

The hydrolysates of the present invention prove effective as pretreatment solutions for a variety of metal surfaces. These metals include aluminum, steel, zinc coated steel (galvanized), phosphated steel, and zinc-aluminum coated steel (GALVALUME®). It has been found that application of the inventive pretreatment solutions to these metals improves their resistance to corrosion and adhesion of later-applied paint.

The copolymers can be prepared following the methods described in Reactions of Vinyltrichlorosilane and Vinyltriethoxysilane, Industrial and Engineering Chemistry, Wagner et al., v. 45. No. 2,367 (1953). The starting materials useful in this invention were vinyltriethoxysilane and either maleic anhydride or acrylic acid.

The copolymers in general have weight ratios ranging from about 40 to about 60% by weight of maleic anhydride to about 60 to about 40% by weight of vinyltrialkoxysilane. The amount of vinyltrialkoxysilane in the copolymer of acrylic acid and vinyltrialkoxysilane ranges up to 25% by weight. The triethoxysilane forms of the copolymers were then hydrolyzed as follows to achieve the desired hydrolysates useful in this invention.

| Hydrolysate Form | Hydrolyzed With: |
| --- | --- |
| 1. Sodium salt | Sodium hydroxide solution, then dried. |
| 2. Trisilanol | Deionized water at 120° F. for 18 hours. |
| 3. Zirconium salt | Fluorozirconic acid, at ambient temperatures for 18 hours or at 120° F. for 4 hours. |
| 4. Zinc salt | Deionized water at 120° F. for 18 hours, then mixed with zinc nitrate solution. |

The zirconium salt was also prepared by metathesis of aqueous solutions of the sodium salt. Hydrolyses were also carried out using phosphoric acid and dihydrofluorotitanic acid.

The hydrolysis to the trisilanol form using only water is an improvement on the art for the hydrolyses of silanes in general, which typically require acidification and/or dissolution in non-aqueous solvents. Unwanted by-products can also be avoided using this direct hydrolysis procedure.

Surprisingly, the aqueous solutions have properties which do not change with time, in contrast to most other silanes. For example, both acidic and alkaline solutions are stable.

The maleic anhydride/vinyltrialkoxysilane copolymer may be hydrolyzed in situ by adventitious water from the process, or water adsorbed to the metal surface.

The hydrolysate may be applied to the metal surface to be treated as an aqueous solution. Generally, the hydrolysate is applied as a solution ranging from 0.02 to about 0.5%. Preferably, the concentration of the hydrolysate solution ranges from 0.15 to about 0.3.

The pretreatment solution may be applied to the metal surface by any conventional means such as spraying, immersion, by dip squeegee, flow coating, roll coating, and the like. The pretreatment solution of the present invention is preferably dried in place.

The preferred embodiments of the present invention are the zinc hydrolysate of the maleic anhydride:vinyltriethoxysilane copolymer for phosphated steel, the zirconium hydrolysate of the acrylic acid:vinyltriethoxysilane copolymer for aluminum, and the zirconium hydrolysate of the maleic anhydride:vinyltriethoxysilane compound for galvanized steel.

The invention will now be further described with reference to a number of specific examples which are to be regarded solely as illustrative and not as restricting the scope of the invention.

PREPARATION OF VINYLTRIETHOXYSILANE/MALEIC ANHYDRIDE COPOLYMER

Maleic anhydride (20.7 g, 0.211 mol) and vinyltriethoxysilane (53.3 g, 0.280 mol) were dissolved in 80 mL of 1,4-dioxane. After sparging with nitrogen for 15 minutes, benzoyl peroxide (1.18 g, 0.0049 mol) was added. The reaction mixture was heated to 90°–92° C. for 17 hours. During this time the clear solution became yellowish. The solvent was removed by distillation to obtain a hard brittle material. The copolymer was characterized by $^1$H, $^{13}$C, and $^{29}$Si NMR.

6.0 g of vinyltriethoxysilane/maleic anhydride copolymer was dissolved in 30 mL of THF and added to 30 mL of DI water to form a dispersion. A 50% aqueous sodium hydroxide solution (7.32 g) was added slowly to the reaction mixture followed by heating to 50°–52° C. for 15 hours. The reaction mixture was concentrated to ~10 mL of solution. A yellow-white solid was precipitated from methanol, filtered, washed with methanol (twice), and dried. The copolymer was characterized by $^{13}$C NMR spectra.

PREPARATION OF VINYLTRIETHOXYSILANE/ACRYLIC ACID COPOLYMER

Acrylic acid (10.51 g, 0.145 mol) and vinyltriethoxysilane (7.80 g, 0.041 mol) were dissolved in 90 mL of toluene and 10 mL of hexane. After sparging with nitrogen for 20 minutes, 2,2'-azobisisobutyronitrile (0.67 g, 0.0041 mol) was added. The reaction mixture was heated slowly to ~70° C.; at 60° C. the solution began to cloud and at 70° C. an exotherm was noticeable. Heating was stopped and the balance of the acrylic acid (15.7 g, 0.218 mol) in 17 mL of toluene was added over 15 minutes. When the reaction temperature dropped below 65° C., heating was continued to maintain the temperature at 70° C. for 2 hours. After cooling, the white precipitate that formed during the reaction was filtered, washed with ether, and dried.

6.0 g of the vinyltriethoxysilane/acrylic acid copolymer was slurried in 102 mL of DI water. A 50% aqueous sodium hydroxide solution (3.76 g) was added rapidly (~5 min) to the reaction mixture. After 20% addition of the sodium hydroxide solution, the reaction mixture gelled. The addition was completed, and the reaction mixture was stirred for 15 hours resulting in a clear solution (5.65% solids).

EXAMPLES

In the following examples, hydrolysates were evaluated for their efficacy as metal pretreatments. The specific hydrolysates utilized in the testing are identified in Table I.

TABLE I

| Treatment | Composition |
| --- | --- |
| A | 2% of 1:1 maleic anhydride:vinyltriethoxysilane copolymer hydrolyzed with sodium hydroxide. pH when diluted 1:10 = 11.5 |
| B | 1.5% of 9:1 acrylic acid:vinyltriethoxysilane copolymer hydrolyzed with sodium hydroxide. pH when diluted 1:10 = 9.9 |
| C | 1.74% of 1:1 maleic anhydride:vinyltriethoxysilane copolymer hydrolyzed with deionized water. pH when diluted 1:10 = 4.63 |
| D | 1.74% of 1:1 maleic anhydride: vinyltriethoxysilane copolymer hydrolyzed with dihydrofluorozirconic acid to pH = 3 |
| E | Composition A acidified to pH = 4 with dihydrofluorozirconic acid |
| F | Composition B acidified to pH = 4 with dihydrofluorozirconic acid |
| G | Composition C combined with one gram-atom of zinc per mole of carboxylic acid moieties, provided by zinc nitrate |
| H (Comparative) | 15% as Betz Permatreat ® 1500, a mixed Hexavalent-trivalent chromium pretreatment containing silicon dioxide |
| I (Comparative) | 5 g/l poly(acrylic acid) with 6 g/l dihydrofluorozirconic aid (see U.S. Pat. No. 4,191,596) |
| J (Comparative) | .15 g/l of diethylenetriamine penta(methylenephosphonic acid), pH = 3.5 with NAOH (see U.S. Pat. No. 4,917,737) |

Permatreat is a registered trademark of Betz Laboratories, Inc., Trevose, Pa.

Compositions E, F, and G were prepared at their final working concentrations, as noted in the following tables.

The use of these compositions as metal surface treatments used in the preparation of the metal for painting is illustrated through the following examples. The effectiveness was evaluated with a variety of paint adhesion tests familiar to those skilled in the art. These tests include: "T-bend": the tendency for paint to disadhere from at 180° bend in the metal (OT equals perfect); "wedge bend": the amount of paint (in millimeters) lost from the surface above the minimum radius of curvature of a bend in a metal. The bend is formed by first turning the painted metal through a radius of about 0.5 centimeters and then flattening an end of the bend to a zero radius. "Reverse impact": tendency of the paint to disadhere from deformed metal caused by an impact of known momentum on the reverse side of the test surface. This test may be done on dry test panels or panels subjected to boiler water prior to impact ( 10=perfect rating, noted in inch-pound impact); "cross-hatch/reverse impact": the tendency of a paint to disadhere from areas between closely spaced lines through the paint scribed prior to reverse impact, the test may be done dry or following boiling water treatment (10=perfect rating); "neutral salt spray": per ASTM-B-117 and rated according to ASTM D-1654, section 7, method 2.

Example 1

Hot-dipped galvanized steel panels were obtained from ACT Corp. They were spray cleaned with a hot alkaline surfactant solution in water, rinsed, passed through squeegee rolls to remove most of the water, and then spin-coated by flooding the panel surface with the designated treatment solutions. The wet panels were spun for 10 seconds after the solutions were applied, and then dried in place on the spinner using a stream of hot air. The dried panels were painted with either (i) an epoxy/siliconized polyester or (ii) an epoxy/fluorocarbon two-coat paint system, cured in accordance with the manufacturers' specifications. The results of this testing are reported in Table II.

TABLE II

| Treatment (% Polymer) | Paint | T-Bend (0 = Perfect) | Wedge Bend Loss (mm) (0 = Perfect) | 240 hour Condensing Humidity Rating (10 = Perfect) | 500 hour Neutral Salt Spray Mean Scribe Rating (10 = Perfect) |
|---|---|---|---|---|---|
| E (.2)  | i  | 2 | 13 | 10  | 9.8 |
| F (.15) | i  | 2 | 8  | 10  | 7.8 |
| H       | i  | 2 | 24 | 8.5 | 10  |
| E (.2)  | ii | 4 | 26 | 10  | 6.0 |
| F (.15) | ii | 3 | 23 | 10  | 6.5 |
| H       | ii | 2 | 40 | 10  | 6.0 |
| A (.2)  | ii | 2 | 20 | 10  | 6.5 |
| C (.17) | ii | 3 | 32 | 10  | 7.0 |
| D (.17) | ii | 3 | 46 | 10  | 7.5 |
| E (.2)  | ii | 4 | 34 | 10  | 8.5 |
| H       | ii | 2 | 12 | 10  | 7.0 |

Example 2

The process of Example 1 was followed, only the substrate was 3003 alloy aluminum, and the paint was either a single-coat acrylic (iii) or a single-coat polyester (iv). The results are presented in Table III.

TABLE III

| Treatment (% Polymer) | | Paint | T-Bend (0 = Perfect) | Wedge Bend Loss (mm) (0 = Perfect) | 240 hour Condensing Humidity Rating (10 = Perfect) | 500 hour Neutral Salt Spray Mean Scribe Rating (10 = Perfect) |
|---|---|---|---|---|---|---|
| A (.2) | | iii | 2 | 10 | 2 | 7.0 |
| B (.15) | | iii | 1 | 8 | 10 | 8.0 |
| H | | iii | 2 | 0 | 10 | 8.8 |
| E | (.13, + .57% $H_2ZrF_6$) | iv | 2 | N/A | 10 | 6.5 |
| F | (.13, + .57% $H_2ZrF_6$) | iv | 2 | N/A | 8.5 | 7.5 |
| H | | iv | 1 | N/A | 10 | 10 |
| I | | iv | 1 | N/A | 10 | 6.0 |

From these data it will be appreciated that for aluminum, in contrast to galvanized steel, the acrylic form of the polymer is preferred, and the overall corrosion resistance compared to the chromium-based comparative treatment is not as great. The corrosion resistance is nonetheless superior to the comparative non-chromium pretreatment.

Example 3

Cold rolled steel panels from ACT Corp. were cleaned and phosphated with a commercial "detergent iron phosphate", also known as a "three-stage" iron phosphate treatment bath familiar to those skilled in the art. After a tap water rinse, the panels were immersed in a solution of composition G that contained 0.035% polymer solids and 0.003 molar zinc at pH=4, and then dried. A single coat polyester paint was applied and cured following the manufacturer's specifications. The results of this testing are presented in Table IV.

TABLE IV

| Treatment | Reverse Impact in - lb Passed | Conical Mandrel Bend Loss (0 = Perfect) | Neutral Salt Spray Mean Scribe Ratings | |
|---|---|---|---|---|
| | | | 72 hours (10 = Perfect) | 168 hours (10 = Perfect) |
| G (.003 M Zn) | 80 | 6 | 8.5 | 6.0 |
| J | 40 | 7 | 7.0 | 6.5 |

These results demonstrate the effectiveness of the present invention at inhibiting corrosion of phosphated steel.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A non-chromate, metal pretreatment composition comprising a zinc salt hydrolysate of a copolymer selected from the group consisting of maleic anhydride and vinyltrialkoxysilane, and acrylic acid and vinyltrialkoxysilane.

2. The composition as claimed in claim 1, wherein said vinyltrialkoxysilane is vinyltriethoxysilane.

3. A non-chromate, metal pretreatment composition comprising a zirconium salt hydrolysate of a copolymer selected from the group consisting of maleic anhydride and vinyltrialkoxysilane, and acrylic acid and vinyltrialkoxysilane.

4. The composition as claimed in claim 3 wherein said vinyltrialkoxysilane is vinyltriethoxysilane.

* * * * *